Patented Dec. 30, 1952

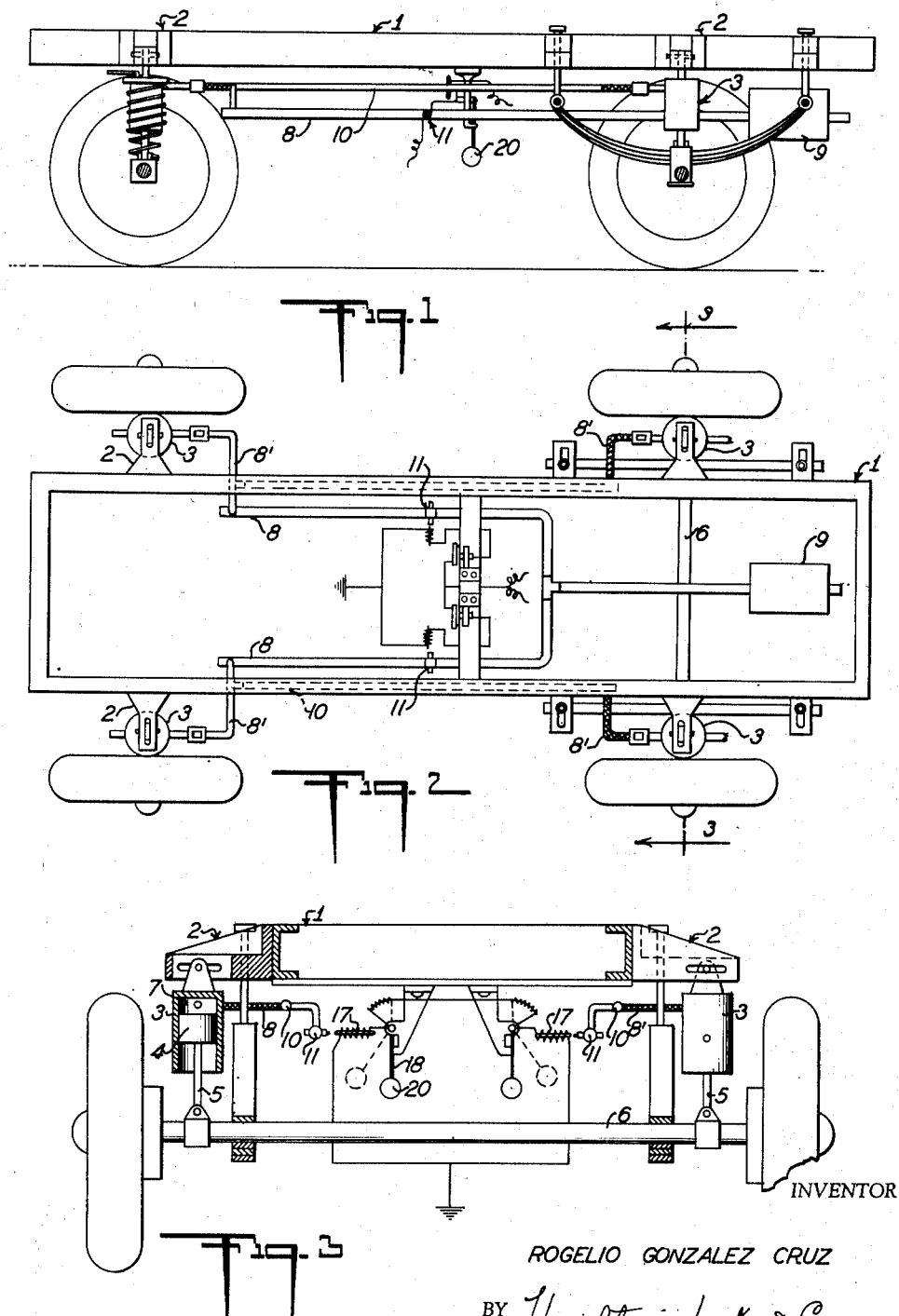

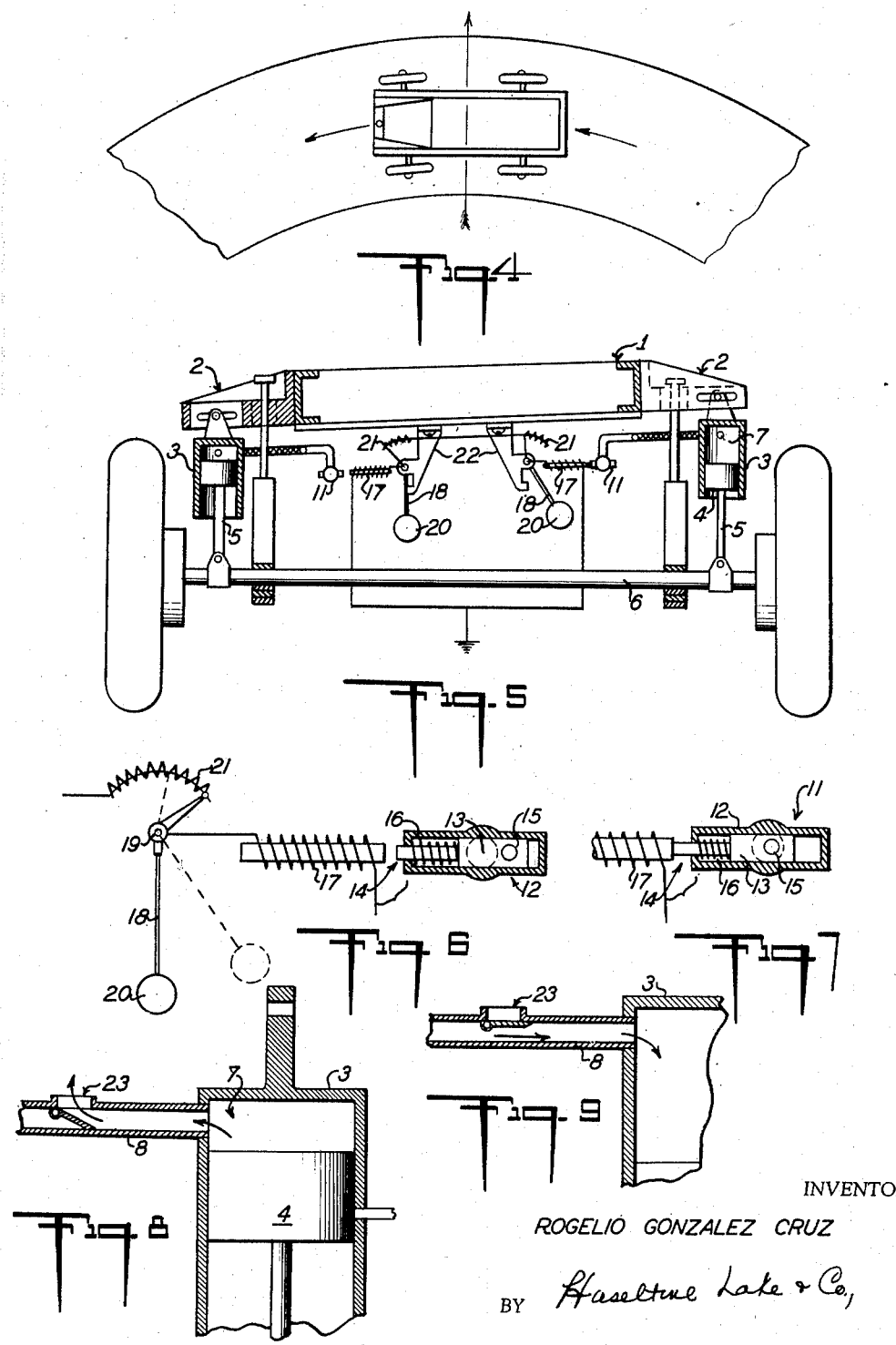

2,623,758

UNITED STATES PATENT OFFICE 2,623,758

STABILIZER DEVICE FOR AUTOMOBILES, TRUCKS, AND THE LIKE

Rogelio González Cruz, Habana, Cuba

Application September 12, 1950, Serial No. 184,395
In Cuba September 15, 1949

4 Claims. (Cl. 280—112)

Innumerable mishaps occur every day with the overturning of automobiles, trucks and similar vehicles, which are caused by several factors, among them, the speed at which said vehicles travel and the sharpness of the curves in the road. Actually, while travelling along a straight path, the high speed does not affect the stability of such vehicles and this factor is not, in consequence, taken into consideration by the motorists; but, upon reaching a curve, the high speed gives rise to a centrifugal force which may overturn the vehicle or cause it to fail to negotiate the curve.

It may also happen, if the vehicle passes over a laterally inclined spot, or unleveled ground, that it will adopt a lateral inclination and if such inclination goes beyond a certain limit, the center of gravity of the vehicle will be positioned laterally beyond its base of support thus causing the vehicle to overturn.

In order to avoid these accidents, which have taken so many lives, I have invented a device the description of which will be made with reference to the annexed drawings, in which the same or like parts bear the same numbers.

In the drawings:

Fig. 1 is a longitudinal section of the chassis of a vehicle provided with my stabilizer device.

Fig. 2 is a top plan view of said chassis, diagrammatically showing the electrical circuits.

Fig. 3 is a transverse sectional view taken along the line 3—3 of Fig. 2 and showing a stabilizing cylinder in section.

Fig. 4 diagrammatically represents the curve of a road and a car travelling through the same at high speed, the curved arrow indicating the direction and course of the movement of the vehicle, and the straight transverse arrow the centrifugal force to which the said vehicle is subjected.

Fig. 5 is a transverse sectional view, along line 3—3 of Fig. 2, showing how the stabilizer device raises the right side of the chassis to level the same.

Fig. 6 is a diagram of the electro-magnetic system that operates the valve regulating the flow of compressed air to a cylinder, with the electro-magnet shown in open circuit position, with the valve closed.

Fig. 7 shows the valve in open position, with the stem of the small plate attracted by the energized electrical magnet, its electric circuit being closed.

Figs. 8 and 9 respectively show the admitting and ejecting positions of the piston of the cylinder, and a check valve located in the conduit communicating with the compressor.

With particular reference to the drawings, reference numeral 1 represents the chassis of an automobile, truck or similar vehicle, with lateral projections 2 extending from its sides in positions overlying the front and rear axles of the vehicle. A cylinder 3 is supported at one end from each projection 2 and has a piston 4 working therein. Each piston 4 is connected by a connecting rod 5 to the adjacent end portion of the underlying axle or axle housing 6.

In the normal horizontal position of the vehicle, the pistons 4 inserted in cylinders 3, are positioned to leave, between their upper faces and the closed ends of the cylinders, chambers 7 which receive conduits 8 communicating with an air compressor 9. Said conduits include flexible portions 8' to permit the relative movements of cylinders 3; and the air is supplied simultaneously to the two cylinders at each side of the vehicle by means of another conduit 10 which extends between the conduits 8 connected to the cylinders at each side. The supply of compressed air to the two cylinders of one side, is regulated through valve 11, independently of the supply to the cylinders of the opposite side, the latter also being regulated by a valve 11, these valves being electro-magnetically operated, as will be explained later.

With particular reference to Figs. 6 and 7, each valve 11 is seen to consist of a small box 12 housing a small plate 13, which is slidable along box 12 and provided with a metallic stem 14 extending from the small box 12 through an opening in one end of the same. The small plate 13 has a transverse perforation 15 and it is forced toward one end of the small box 12, as shown in Fig. 6, through the action of a spiral spring 16 disposed around stem 14 and abutting at one end against small plate 13 and at the other end against the inner face of the end wall of the box 12 where stem 14 comes out. In the spring urged position of Fig. 6, valve 11 is closed; but when small plate 13 is displaced toward the opposite end of the box 12, against the action of spring 16, as when its stem 14 is attracted by electro-magnet 17, as shown in Fig. 7, then the transverse perforation 15 becomes registered or lined up with the openings of the compressed air conduit in which the valve 11 is interposed to permit the air from compressor 9 to pass to the cylinders of the corresponding side.

There are two electro-magnets 17, one for each of the valves 11, and these electro-magnets are each connected in an electric circuit which is preferably fed from the battery of the vehicle. If desired the circuits for the electro-magnets may have a common ground at a suitable point on the vehicle chassis.

Each electric circuit for energizing the related electro-magnet is not always closed, on the contrary, it is open normally, but is adapted to be closed by means of angular lever 18 pivoted as at 19 intermediate its ends on a suitable part of the chassis for lateral swinging. One of the lever arms extends downwardly and carries a counterweight 20 at its end, while the other arm, which is shorter, is adapted to close the related electric circuit when the long lever arm is displaced from its position perpendicular to the vehicle chassis.

Adjacent to the shorter arm of each of the levers 18, and forming part of the related electric circuit, a rheostat 21 is provided, or any other similar device, operative to change the current flowing in the circuit. The rheostat 21 is arranged so that the shorter arm of the related lever 18 is spaced from the rheostat when the larger arm is perpendicular to the vehicle chassis, as shown in full lines in Figs. 3 and 6; but when lever 18 is deviated from its normal resting position, as shown in dotted lines in the same Figs. 3 and 6, or when the chassis is inclined from the horizontal, then the shorter arm of lever 18 contacts rheostat 21, which is fixed to the chassis for movement with the latter, and closes the related electric circuit.

The different points along the rheostat at which the shorter arm of the said lever 18 may contact the rheostat in closing the circuit, determine the magnitude of the electric current flowing in the circuit and, in consequence, the magnitude of the attraction force exerted by the electro-magnet 17 on the stem 14 of the small plate 13 of the related valve 11. A smaller attraction force causes a predetermined displacement of stem 14 and certain slipping of small plate 13 so that the perforation 15 of the latter will partially register with the openings of the compressed air conduit in which the valve 11 is inserted, permitting a flow of compressed air to the corresponding cylinders 3 at one side of the vehicle. A bigger attraction force exerted by electro-magnet 17, will cause a larger displacement of stem 14 until the latter engages against the core of the electro-magnet, as shown in Fig. 7, in which position perforation 15 of the small plate 13 will fully coincide, or be totally registered, with the openings of the compressed air conduit and the flow of compressed air to the related cylinders being larger.

The compressed air admitted into chambers 7 of cylinders 3 pushes downward on pistons 4, but since these are fixed and cannot go down, the action is then exerted against the upper closed ends of cylinders 3, displacing the latter upwardly and these in turn will raise the chassis to its horizontal position or to a position perpendicular to the bigger arm of the displaced lever 18. Each lever 18 is preferably pivoted on a bracket 22 fixed to a cross member of the chassis and formed with a stop portion dimensioned and arranged to prevent inward oscillation of the large arm of the related lever.

The device operates as follows: Let us suppose that an automobile provided with my invention runs at high speed approaching a curve, as shown in Fig. 4. In this case, the centrifugal force developed in the curve will cause an outer displacement of the larger arm of the right lever and its counterweight 20, that is, the lever on the outside of the curved path, rotating the lever on its pivot, to displace the smaller arm of that lever inwardly, thus contacting rheostat 21 and causing the closing of the related electric circuit. The corresponding electro-magnet 17 will attract stem 14, and the small plate 13 will be displaced to the left against the action of spring 16 and its perforation 15 will come into partial or complete registry with the openings of the compressed air conduit, and the compressed air will flow toward the two cylinders 3 at the right or outer side of the vehicle, thus raising the right or outer side of the chassis to a point of balance of forces which avoids or lessens in great proportion the possibility of an overturn, as shown in Fig. 5. When the automobile leaves the curve and assumes a straight path of travel, the centrifugal force acting on the levers 18 disappears and the larger arm of lever 18, by gravity, returns to the former vertical position, thus opening the circuit. The deenergized electro-magnet will stop attracting stem 14 and spring 16 expands, displacing small plate 13 toward the right to its rest position in which its perforation 15 does not coincide with the openings of the air conduits, and thereby stopping the feeding of compressed air toward cylinders 3. Then, by its own weight, the raised side of the chassis tends to reach its lower horizontal position, pushing cylinders 3 of that side and the compressed air in the latter will be ejected to the exterior through suitable check valves 23 (Figs. 8 and 9) interposed in the conduits 8 and which allow the admission of compressed air toward the cylinders, while simultaneously closing the exterior opening, as shown in Fig. 9, and, when the flow of compressed air is halted, prevent the backward flow of the compressed air from the cylinders toward the source, while then opening the exhaust opening to atmosphere, as shown in Fig. 8, to facilitate the return of the vehicle to its horizontal position.

Let us suppose now an automobile, or a loaded truck, provided with my device, passing over an unleveled road, and reaches a spot so uneven in elevation that the vehicle is inclined laterally and threatens an overturn. In this case, the chassis is in inclined position, for example, to the left, as if deviated from a longitudinal axis; but this inclination of the chassis does not affect the left lever 18, which maintains its position by its pivoting and the action of gravity that forces its larger arm with counterweight 20 to stand vertically. Through the stability of left lever 18 and the relative displacement of the related rheostat 21 downward and toward the left, the shorter arm of said left lever 18 contacts rheostat 21, thus closing the circuit. (The point on the rheostat contacted by the lever and, in consequence, the intensity of the electric current in the circuit, shall depend upon the angle of inclination of the chassis.) When the circuit is closed, the corresponding electro-magnet 17 will attract stem 14 of small plate 13 of left valve 11, and the compressed air will flow toward cylinders 3 of the said left side, raising that side of the chassis to a balance of forces and displacing the center of gravity of the loaded truck toward the supporting base. This may occur when the truck is still or running, but on reaching a leveled road, the device returns to its normal state and resting or inactive position.

Although the invention has been described in detail and exemplified with two examples, it will be understood that the principles of the invention may be modified without altering the essence and spirit of the same such as will occur to those skilled in the art.

What I claim is:

1. In an automotive vehicle having a chassis and wheel supporting axles resiliently carried by the chassis: a lateral stabilizing device comprising cylinders, each having a piston working therein, and adapted for mounting between the chassis and axles at the opposite sides of the vehicle; means for supplying a pressurized fluid; first conduit means for communicating said fluid supplying means with the cylinders at one side of the vehicle; second conduit means for communicating said fluid supplying means with the cylinders at the other side of the vehicle; regulating valve means in each of said first and second conduit means for controlling the flow of pressurized fluid to the related cylinders; electro-magnetic actuating means for manipulating each of said regulating valve means; an electrical circuit for controlling each of said electro-magnetic actuating means; said electro-magnetic actuating means manipulating the related regulating valve means in response to the magnitude of the electric current in the associated electrical circuit; and separate means for controlling the flow of current in each of said electrical circuits including rheostat means interposed in said circuit and having a variable resistance adapted to be fixed relative to the chassis and a movable contact arm normally spaced from said resistance, a weighted lever connected to said movable contact arm, and means for pivotally mounting said weighted lever on the chassis to move said contact arm over said variable resistance when said weighted lever is displaced laterally from a normal position perpendicular to the chassis.

2. In an automotive vehicle: a lateral stabilizing device according to claim 1; wherein said conduit means have exhaust openings therein disposed between each of said cylinders and the related regulating valve means; and further comprising check valve means for each of said exhaust openings operative to close the associated exhaust opening in response to the flow of pressurized fluid in the direction toward the related cylinder and to open said exhaust opening and simultaneously close the conduit means at the side of said opening remote from the related cylinder in response to the flow of pressurized fluid from said related cylinder.

3. In an automotive vehicle: a lateral stabilizing device according to claim 1; wherein each of said regulating valve means includes a valve casing interposed in the related conduit means and having the latter opening into the interior at opposite sides thereof, a valve member slidable in said housing and having an aperture for progressive registration with the related conduit means, and resilient means yieldably urging said valve member to a position in which the aperture of the latter is out of registration with respect to the related conduit means; and wherein said electro-magnetic actuating means is positioned to apply an attracting force to said valve member, when energized, for moving said valve member in the direction opposed by said resilient means into progressive registration with said related conduit means.

4. In an automotive vehicle: a lateral stabilizing device according to claim 1; further comprising stop means associated with each of the weighted levers to permit swinging of the associated lever from its normal position only in the direction toward the side of the vehicle at which the related cylinders are disposed.

ROGELIO GONZÁLEZ CRUZ.

REFERENCES CITED

The following references are of record in the file of this patent:

UNITED STATES PATENTS

| Number | Name | Date |
|---|---|---|
| 2,184,202 | Tschanz | Dec. 19, 1939 |
| 2,247,749 | De Venel | July 1, 1941 |
| 2,353,503 | Rost et al. | July 11, 1944 |
| 2,474,471 | Dolan | June 28, 1949 |

FOREIGN PATENTS

| Number | Country | Date |
|---|---|---|
| 521,741 | Great Britain | May 30, 1940 |